A. L. & J. C. KIRKPATRICK.
COTTON CULTIVATING IMPLEMENT.
APPLICATION FILED APR. 1, 1908.
907,508. Patented Dec. 22, 1908.
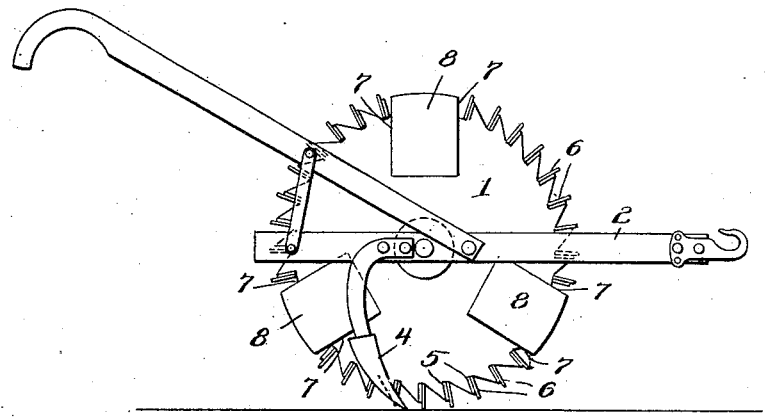
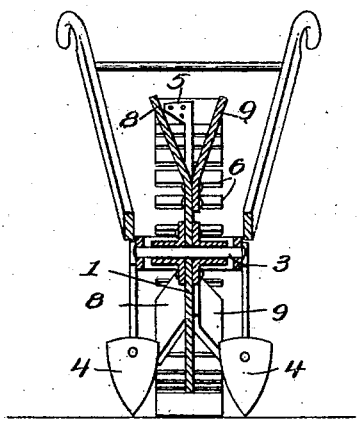
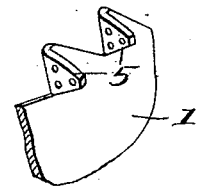

UNITED STATES PATENT OFFICE.

ALEXANDER L. KIRKPATRICK AND JAMES C. KIRKPATRICK, OF CORNISH, OKLAHOMA.

COTTON-CULTIVATING IMPLEMENT.

No. 907,508.      Specification of Letters Patent.      Patented Dec. 22, 1908.

Application filed April 1, 1908. Serial No. 424,621.

*To all whom it may concern:*

Be it known that we, ALEXANDER L. KIRKPATRICK and JAMES C. KIRKPATRICK, citizens of the United States, residing at Cornish, in the county of Jefferson and State of Oklahoma, have invented new and useful Improvements in Cotton-Cultivating Implements, of which the following is a specification.
The invention relates to an improvement in cotton cultivating implements and is directed particularly to a cotton chopper or thinner adapted to be used in conjunction with any cultivator or similar implement.
The main object of the present invention is the provision of a cotton chopper in the use of which the plants may be properly thinned out, the construction including a means whereby the standing plants are protected against the action of the cultivator with which the chopper or thinner is associated.

The invention will be described in the following specification, reference being had particularly to the accompanying drawings, in which:—

Figure 1 is a view in side elevation illustrating the application and use of our improved cotton chopper or thinner. Fig. 2 is a vertical central transverse section of the same. Fig. 3 is a broken perspective showing a portion of the chopping wheel, illustrating more particularly the construction of the wheel to provide the blade supports.
Referring particularly to the accompanying drawings, our improved cotton chopper is in the form of a wheel 1, preferably of solid type and adapted to be used in conjunction with another cotton treating implement, as a cultivator 2, in which use the chopping wheel is mounted upon a shaft 3 supported in the cultivator beams and so arranged that said chopper is operative immediately preceding the action of the cultivator shovels 4.

The peripheral edge of the wheel 1 is at determinate intervals cut along lines extending in a direction about equally between the tangential and the radial. These incisions are continued from the peripheral edge of the disk inward for a short distance, providing tongues 5 which are bent laterally to the plane of the disk to provide supporting members for the blades. These blades 6, which are of any appropriate type, are secured to the tongues 5 and are preferably of a length to extend in both directions beyond the surfaces of the wheel, so that in edge view the blades project materially beyond the edge of the wheel in opposite directions. At determinate intervals in the periphery of the wheel a pair of parallel incisions 7 are made, both of which extend some distance into the wheel and in a direction parallel to the diameter of the wheel. The material included between these incisions is then bent outwardly from the surface of the wheel and at an angle thereto providing a wall 8, which, at its lower end, is coincident with the surface of the wheel and at its outer edge is disposed beyond said surface. A similar wall 9 is secured in any appropriate manner to the opposite side of the wheel from that including the integral wall 8, said wall 9 corresponding in all respects to the wall 8 and being disposed directly opposite the same. By this means there is provided at the peripheral edge of the wheel a pair of opposing walls, which at their free edge are spaced the maximum distance apart, and which from said free edge incline toward the center of the wheel to the approximate surface thereof. These walls 8 form a housing for the standing plants which are to remain in the row after the operation of the chopper, and said housings are, of course, to be arranged in that number circumferentially of the wheel as will provide the desired number of hills in which the plants may be left standing. That portion of the wheel in which the walls 8 are formed is, of course, free of the tongues 5, as the plants protected by the housings are not to be cut away.

In use the implement traveling lengthwise the field above the cotton row will cause that portion of the row engaged by the blades in succession to be pressed down, chopped clean or clear of the plants, while those portions of the row which are engaged by the housings in the travel of the implement will remain standing, thus thinning the plants to the desired extent. It is, of course, to be understood that the walls 8 and 9 are so arranged as to receive the plants to be protected between them in the travel of the implement, under which conditions it will be further noted that said walls act as a protector against the soil thrown up by the cultivator shovels, that is that said dirt cannot reach the plants arranged within the housing. These plants, therefore, are protected against being covered in the use of the cultivator, while those chopped or broken and held down by the blades or pedals are effectively covered by the shovels.

While adapting the chopper primarily for use in connection with the cultivating implements it is to be understood that it is equally serviceable with other implements designed for cotton cultivation.

Having thus described the invention what is claimed as new, is:—

1. A thinning chopping wheel having a series of edge incisions, the material of the wheel being bent laterally to provide chopping blade supports.

2. A chopping wheel having parallel incisions leading from the edge thereof, the material included between said incisions being bent at an angle to the surface of the wheel to provide a housing wall.

3. A chopping wheel having parallel incisions leading from the edge thereof, the material included between said incisions being bent at an angle to the surface of the wheel to provide a housing wall, and an opposing wall secured to the wheel.

4. A chopping wheel having parallel incisions leading from the edge thereof, the material included between said incisions being bent at an angle to the surface of the wheel to provide a housing wall, and an opposing wall secured to the wheel, said walls inclining outwardly with relation to each other toward the periphery of the wheel.

5. A thinning wheel and a series of blades riveted thereto bent laterally to the plane of the wheel extending on either side to provide chopping blades.

In testimony whereof we affix our signatures in presence of two witnesses.

ALEXANDER L. KIRKPATRICK.
JAMES C. KIRKPATRICK.

Witnesses:
R. E. FISHER,
J. H. WHITESIDE.